US008303414B2

(12) United States Patent
Joshi

(10) Patent No.: US 8,303,414 B2
(45) Date of Patent: Nov. 6, 2012

(54) METHOD OF TRANSFERRING GAMING DATA ON A GLOBAL COMPUTER NETWORK

(75) Inventor: Shridhar P. Joshi, Skokie, IL (US)

(73) Assignee: WMS Gaming Inc., Waukegan, IL (US)

( * ) Notice: Subject to any disclaimer, the term of this patent is extended or adjusted under 35 U.S.C. 154(b) by 393 days.

(21) Appl. No.: 12/075,822

(22) Filed: Mar. 14, 2008

(65) Prior Publication Data

US 2008/0234050 A1 Sep. 25, 2008

Related U.S. Application Data

(62) Division of application No. 09/688,501, filed on Oct. 16, 2000, now Pat. No. 7,470,196.

(51) Int. Cl.
*A63F 9/24* (2006.01)
*A63F 13/00* (2006.01)
*A63F 13/12* (2006.01)

(52) U.S. Cl. .......................................... 463/42; 463/29

(58) Field of Classification Search .................... 463/29, 463/42
See application file for complete search history.

(56) References Cited

U.S. PATENT DOCUMENTS 4,339,798 A 7/1982 Hedges et al. ................ 364/412
4,856,787 A 8/1989 Itkis
4,858,930 A 8/1989 Sato ................................ 273/85
5,489,103 A 2/1996 Okamoto ....................... 273/433
5,586,937 A 12/1996 Menashe
5,655,961 A 8/1997 Acres et al. ..................... 463/27
5,707,286 A 1/1998 Carlson ........................... 463/16
5,759,102 A 6/1998 Pease et al. ...................... 463/42
5,762,552 A 6/1998 Vuong et al. .................... 463/25
5,770,533 A 6/1998 Franchi ........................... 463/42
5,800,268 A 9/1998 Molnick ......................... 463/40
5,816,918 A 10/1998 Kelly et al. ..................... 463/16
5,823,879 A 10/1998 Goldberg et al.
5,830,069 A 11/1998 Soltesz et al. .................. 463/42
5,851,149 A 12/1998 Xidos et al. ...................... 463/42
5,971,271 A 10/1999 Wynn et al. ................... 235/380
5,971,849 A 10/1999 Falciglia ......................... 463/16
5,980,384 A 11/1999 Barrie ............................. 463/16
5,999,808 A 12/1999 LaDue .......................... 455/412
6,001,016 A 12/1999 Walker et al.
6,012,983 A 1/2000 Walker et al. ................... 463/20
6,012,984 A 1/2000 Roseman (Continued)

FOREIGN PATENT DOCUMENTS

EP 0829 834 A2 5/1998

(Continued)

*Primary Examiner* — Dmitry Suhol
*Assistant Examiner* — Andrew Kim
(74) *Attorney, Agent, or Firm* — Nixon Peabody LLP

(57) ABSTRACT

A remote gaming method comprising a player accessing, via a remote terminal, a gaming site on a global computer network connected to the remote terminal. The player is able to provide via the remote terminal, personal identification information to the gaming site and select, via the remote terminal, a game of chance located at a gaming establishment for remote play. The remote terminal is located outside the gaming establishment. The player places, via the remote terminal, a wager for playing the selected game and receives randomly generated text or graphical outcome data at the remote terminal for the selected game. The outcome data being generated by either a gaming server or a gaming machine at the gaming establishment and is subsequently relayed to the gaming site.

20 Claims, 3 Drawing Sheets

U.S. PATENT DOCUMENTS

| | | | | |
|---|---|---|---|---|
| 6,077,162 | A | 6/2000 | Weiss | 463/26 |
| 6,080,062 | A | 6/2000 | Olson | 463/42 |
| 6,089,975 | A | 7/2000 | Dunn | 463/16 |
| 6,089,982 | A | 7/2000 | Holch et al. | 463/42 |
| 6,098,985 | A | 8/2000 | Moody | 273/292 |
| 6,104,815 | A | 8/2000 | Alcorn et al. | |
| 6,113,495 | A | 9/2000 | Walker et al. | 463/42 |
| 6,117,011 | A | 9/2000 | Lvov | 463/25 |
| 6,135,884 | A | 10/2000 | Hedrick et al. | 463/20 |
| 6,135,887 | A | 10/2000 | Pease et al. | 463/42 |
| 6,166,729 | A * | 12/2000 | Acosta et al. | 715/719 |
| 6,183,366 | B1 | 2/2001 | Goldberg et al. | 463/42 |
| 6,196,920 | B1 | 3/2001 | Spaur et al. | 463/42 |
| 6,210,274 | B1 | 4/2001 | Carlson | 463/16 |
| 6,264,557 | B1 * | 7/2001 | Schneier et al. | 463/29 |
| 6,264,560 | B1 | 7/2001 | Goldberg et al. | 463/42 |
| 6,264,561 | B1 | 7/2001 | Saffari et al. | 463/42 |
| 6,272,223 | B1 | 8/2001 | Carlson | 380/251 |
| 6,273,820 | B1 | 8/2001 | Haste, III | 463/40 |
| 6,273,821 | B1 | 8/2001 | Moriguchi | 463/42 |
| 6,280,325 | B1 | 8/2001 | Fisk | 463/19 |
| 6,286,003 | B1 | 9/2001 | Muta | 707/10 |
| 6,287,200 | B1 | 9/2001 | Sharma | 463/40 |
| 6,334,104 | B1 | 12/2001 | Hirai | 704/258 |
| 6,346,048 | B1 | 2/2002 | Ogawa et al. | 463/42 |
| 6,354,946 | B1 | 3/2002 | Finn | 463/40 |
| 6,361,437 | B1 * | 3/2002 | Walker et al. | 463/23 |
| 6,402,618 | B1 | 6/2002 | Reed et al. | 463/40 |
| 6,406,371 | B1 | 6/2002 | Baba et al. | 463/42 |
| 6,409,602 | B1 | 6/2002 | Wiltshire et al. | 463/42 |
| 6,428,413 | B1 | 8/2002 | Carlson | 463/16 |
| 6,454,650 | B1 | 9/2002 | Aronin | 463/17 |
| 6,488,580 | B1 | 12/2002 | Robb | 463/23 |
| 6,508,709 | B1 * | 1/2003 | Karmarkar | 463/42 |
| 6,508,710 | B1 | 1/2003 | Paravia et al. | 463/42 |
| 6,575,834 | B1 | 6/2003 | Lindo | 463/40 |
| 6,652,378 | B2 | 11/2003 | Cannon et al. | 463/20 |
| 6,749,510 | B2 | 6/2004 | Giobbi | 463/42 |
| 6,805,634 | B1 | 10/2004 | Wells et al. | 463/42 |
| 6,986,055 | B2 | 1/2006 | Carlson | 713/200 |
| 7,260,834 | B1 | 8/2007 | Carlson | 726/4 |
| 7,303,473 | B2 | 12/2007 | Rowe | 463/42 |
| 2001/0044337 | A1 | 11/2001 | Rowe et al. | 463/29 |
| 2001/0044339 | A1 | 11/2001 | Cordero et al. | 463/42 |
| 2002/0037767 | A1 | 3/2002 | Ebin | 463/25 |
| 2002/0045484 | A1 | 4/2002 | Eck et al. | 463/42 |
| 2002/0073043 | A1 | 6/2002 | Herman et al. | 705/64 |
| 2002/0087876 | A1 | 7/2002 | Larose | 713/200 |
| 2002/0116615 | A1 | 8/2002 | Nguyen et al. | 713/168 |
| 2002/0137217 | A1 | 9/2002 | Rowe | 436/42 |
| 2002/0138594 | A1 | 9/2002 | Rowe | 709/219 |
| 2003/0028567 | A1 | 2/2003 | Carlson | 708/250 |
| 2003/0162589 | A1 | 8/2003 | Nguyen et al. | 463/25 |
| 2004/0209660 | A1 | 10/2004 | Carlson et al. | 463/1 |
| 2005/0193209 | A1 | 9/2005 | Saunders et al. | 713/182 |
| 2006/0165235 | A1 | 7/2006 | Carlson | 380/268 |

FOREIGN PATENT DOCUMENTS

| | | | |
|---|---|---|---|
| EP | 0843272 | A1 | 5/1998 |
| EP | 1013321 | | 6/2000 |
| EP | 1078667 | | 2/2001 |
| EP | 1177822 | | 2/2002 |
| WO | WO 98/35309 | A1 | 8/1998 |
| WO | WO 01/91866 | A1 | 12/2001 |
| WO | WO 2004/034223 | | 4/2004 |

* cited by examiner

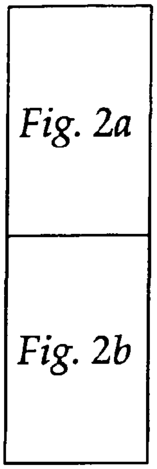
*Fig. 2a*
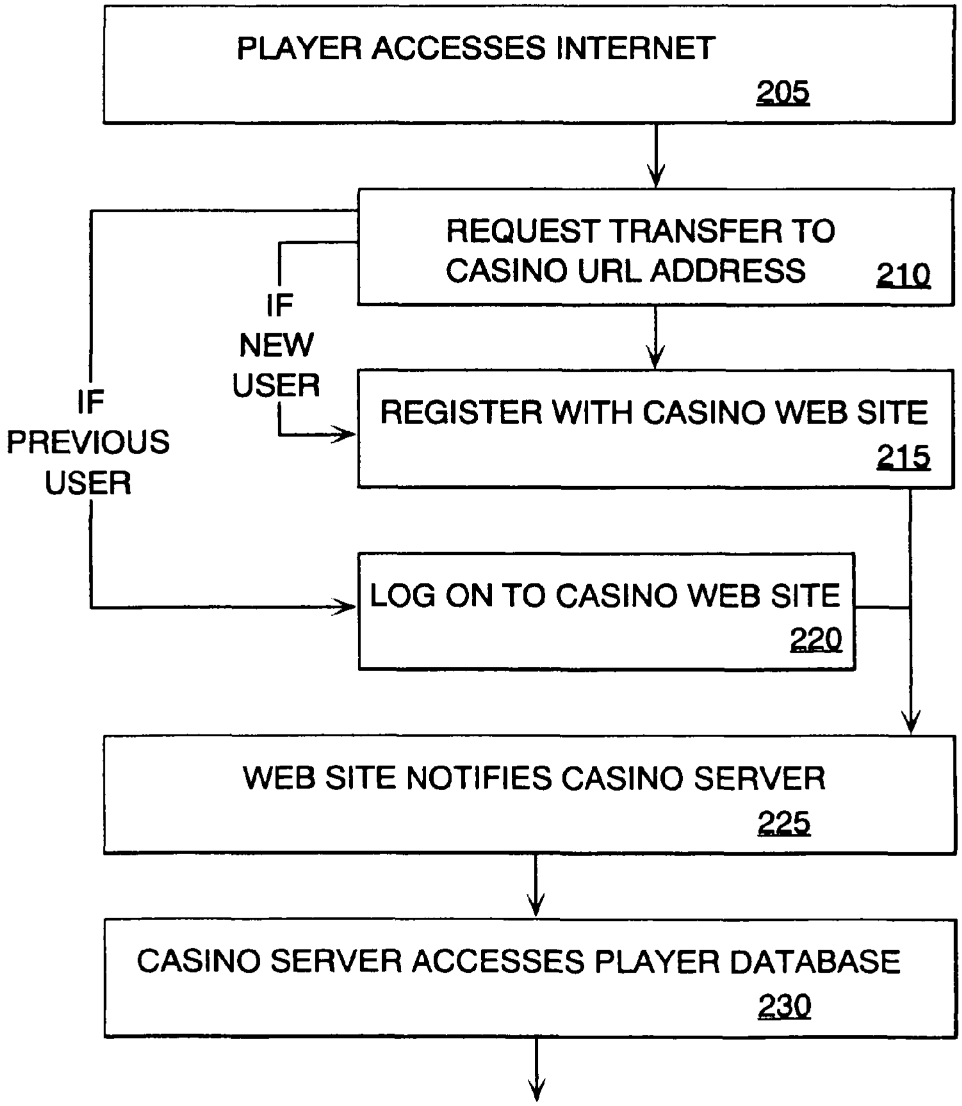

METHOD OF TRANSFERRING GAMING DATA ON A GLOBAL COMPUTER NETWORK

CROSS REFERENCE TO RELATED APPLICATION

This application is a divisional of U.S. application Ser. No. 09/688,501 filed on Oct. 16, 2000 now U.S. Pat. No. 7,470,196 and entitled "METHOD OF TRANSFERRING GAMING DATA ON A GLOBAL COMPUTER NETWORK," which is hereby incorporated by reference in its entirety.

FIELD OF THE INVENTION

The present invention relates generally to gaming machines and, more particularly, to a method of transferring data from a gaming establishment to a player at a remote site via a global computer network.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money and the intrinsic entertainment value of the machine relative to other available gaming options. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce different methods to attract frequent play by enhancing the entertainment value and excitement associated with the game.

Many game players want to be able to play gaming machines much more frequently then they are currently able to do. Such players are often limited because of the requisite travel required to attend casinos or other legal gaming establishments located in select portions of the United States. The involvedness, cost and inconvenience of a player being forced to travel to a gaming establishment severely limits the amount of gambling excursions that a player can assume. Furthermore, since these excursions are infrequent, a gaming player is often forced to spend as much time gambling as possible during the excursion because such a player may not have the means to return to the gaming establishment for several months or years. There is continuing need for a gaming player to be able to gamble more frequently or for a shorter period time than is currently available and to be able to do so from a location remote to the gaming establishment.

The present invention is directed to satisfying these needs. The foregoing and other advantages of the invention will become apparent upon reading the following detailed description.

SUMMARY OF THE INVENTION

A remote gaming method comprising a player accessing, via a remote terminal, a gaming site on a global computer network connected to the remote terminal. The player is able to provide via the remote terminal, personal identification information to the gaming site and select, via the remote terminal, a game of chance located at a gaming establishment for remote play. The remote terminal is located outside the gaming establishment. The player places, via the remote terminal, a wager for playing the selected game and receives randomly generated text or graphical outcome data at the remote terminal for the selected game. The outcome data being generated by either a gaming server or a gaming machine at the gaming establishment and is subsequently relayed to the gaming site.

BRIEF DESCRIPTION OF THE DRAWINGS

FIGS. 2*a* and 2*b* is a flow chart describing the process by which a player uses a remote terminal to wager on a gaming establishment's gaming machine.

DESCRIPTION OF SPECIFIC EMBODIMENTS

Figure 1:
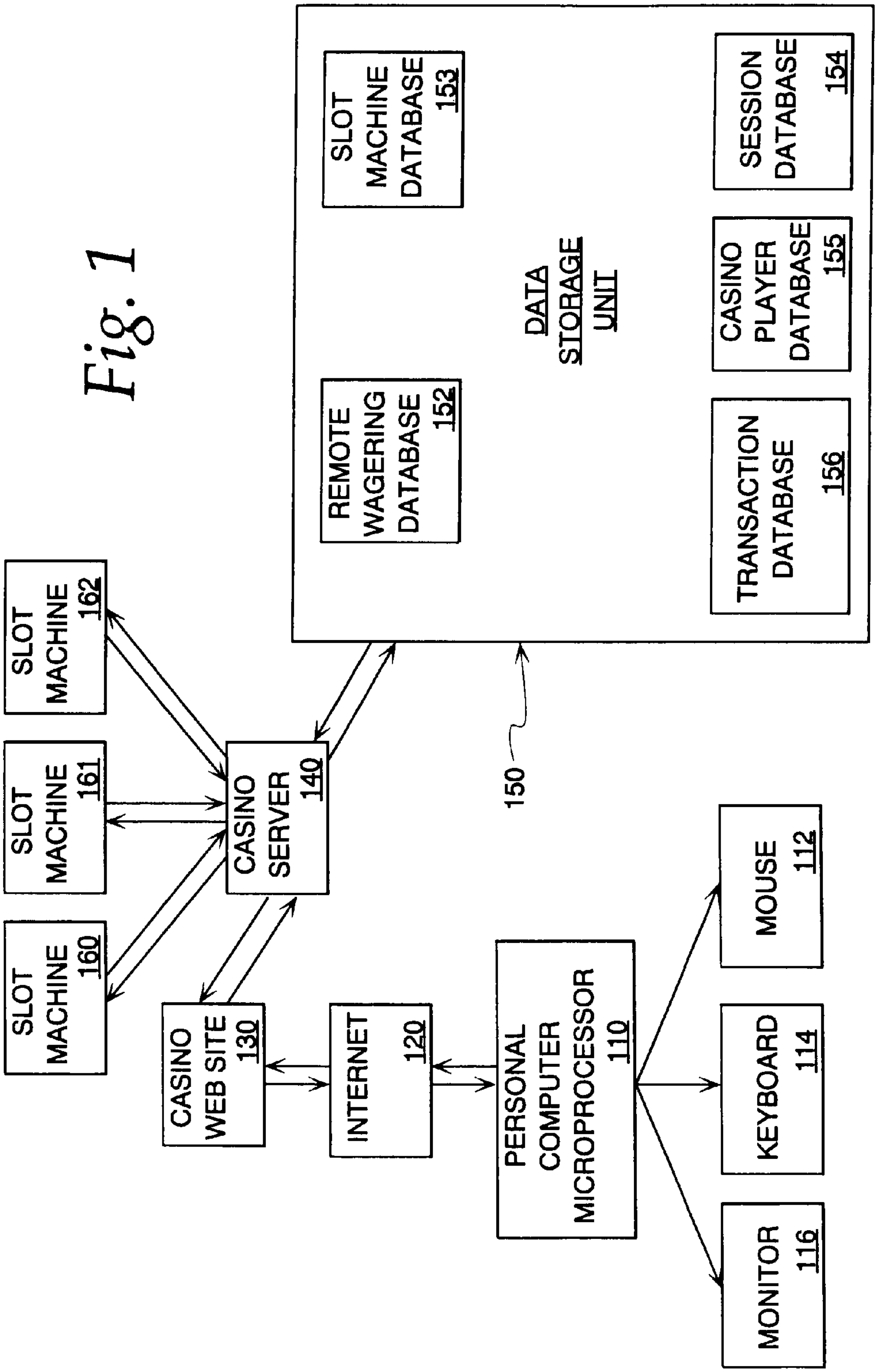
FIG. 1 is a block schematic diagram of a global computing network connecting a personal computer through a web site to a game server.

While the invention is susceptible to various modifications and alternative forms, specific embodiments have been shown by way of example and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

The present invention comprises a method by which data can be transferred from a gaming establishment to a gaming player disposed in a remote location from the gaming establishment. Generally, a player accesses the host gaming establishment by use of a global computer network. The host gaming establishment engages in gambling-type activities (e.g., a slot machine play) and reports the outcomes to the remote player.

During the 1990's, global computer networks, such as the World Wide Web accessed through the Internet, became increasingly popular outlets. It is contemplated in accordance with the present invention that other types of global computer networks are available. The Internet is a global communications network built on worldwide data and telephone networks. Computers connected to the Internet can exchange information with any other connected computer. The backbone of the Internet is founded on various sets of major telephone conduits and switches that exist across the world. These communications conduits are designed to move large volumes of data traffic at extremely high rates of speed.

Each of the major conduits referred to above terminates at a router, which is a large, fast switch that sorts the large volumes of data. Each router is connected to additional, local routing devices. Local routing devices, called "points of presence" provide local Internet access. For example, an Internet termination router located in Chicago may have point of presence routers connected in, for example, Milwaukee and Indianapolis. A router is able to connect as many point of presence routers as the capacity of the switching systems and the Internet will permit.

In addition to point of presence routers, commercial Internet exchanges and global Internet exchanges also connect to the routers. These exchanges transfer data between Internet service providers, both nationally and internationally. When data originates on one U.S. Internet service provider with a destination on another U.S. long distance provider, the data is first routed to the commercial Internet exchange where it makes the transfer between providers.

Personal computers typically connect to a local point of presence router through a local Internet carrier. A local Internet carrier obtains a direct line to the point of presence router and provides a modem or other connection by which a personal computer user achieves Internet access. When the personal computer connects to the modem of the local Internet carrier, the local Internet carrier switches the home computer to the point of presence router, which in turn connects the personal computer to the Internet.

Another method of connecting computers to the Internet is by direct connection through a local area network (LAN) to the point of presence. Multiple personal computers can be connected to a single LAN, which connects to the point of presence through a leased data line. The computers connected to the LAN receive and transmit data to the point of the presence through the LAN.

Attached to most LANs are a variety of different servers including the File Server and the Hypertext Transport Protocol ("HTTP") server. The File Server connects to the LAN and contains the common data files used by the personal computers, the LAN and other servers. An HTTP server is a particular type of server that processes incoming and outgoing data written according to a certain Internet communication protocol, called hypertext transport protocol.

As described above, the Internet is able to interconnect every computer on the Internet with every other computer on the Internet. An Internet site typically includes certain data files (called "web pages" that are a part of the World Wide Web) in its File Server. The Internet site HTTP server makes those pages available to other computers on the Internet. An HTTP Server that makes World Wide Web pages available on the Internet usually includes a so-called "home page," the starting point for outside users to navigate through the underlying World Wide Web pages serviced by the HTTP Server. These World Wide Web pages are written in a special World Wide Web language called Hypertext Markup Language ("HTML"). When a personal computer user wants to view a home page, it can do so by requesting that data over the Internet. In response, the requisite LAN retrieves the web page data from its File Server and instructs its HTTP Server to transmit the data, addressed via the Internet, to the personal computer that requested the information. The data generally travels from the local leased link to the point of presence router near the location of the LAN, through the Internet, through the point of presence router near the requesting personal computer, through the local Internet carrier, and into the modem of the requesting personal computer.

Transmission Control Protocol/Internet Protocol ("TCP/IP") controls transmission of data on the Internet to provide World Wide Web communication to users. To insure that data is sent to and received by the appropriate receiver on the Internet, every device communicating on the Internet is assigned a unique address called an Internet Protocol ("IP") address. Elements of the IP address identify the location in the network that a device is connected. Other parts of the IP address identify the specific device. The IP address number has a three-digit element that identifies the state of the resident and an additional seven digits, three of which identify the local exchange of the resident and four digits that specifically identify the home of the resident. The IP address is presently a thirty-two bit binary address, readily processed by computers, but cumbersome for use by human users. Consequently, the majority of IP addresses are assigned mnemonics to make them more "user friendly." The mnemonic consists of two parts: a host name and a domain name. It is this representation of the IP address that is commonly used by Internet users to access Web sites. Conventionally within the World Wide Web, the mnemonic "WWW" is used to represent the host name. The remaining portion of the mnemonic represents the domain or network where the host resides. For example, www.uspto.gov, identifies a host named "www" in the domain (network) "uspto.gov".

The standard protocol used by Internet components to address each other and usually is used as a Uniform Resource Locator ("URL"). This terminology appears as the opening element in the web site address. For example, http://www.uspto.gov, the Uniform Resource Locator indicates that the request is for "http" formatted data, (i.e., a web page as opposed to, for example, an electronic mail message). The home page for the data resides on the "www" HTTP server on the "uspto.gov" LAN (or domain). The name of the file (to be found most likely in the file server supported by the uspto.gov LAN) is "homepage.html."

Once a user has received an "HTML" formatted file corresponding to a web page, the text of the displayed file may prompt the user to request additional information contained in different web page files. The prompts are referred to as "hypertext" and usually show up on a home page (or other web page) in a different color than normal text, thus distinguishing them as hypertext links. Hypertext links in a document allow a reader to jump from one object to another object within the document and to objects outside of the document. Hyperlinks between documents create an informational space with no formal pathways. Hyperlinks may include any kind of hypertext or other hypermedia link connecting one HTML page to another HTML page in the currently displayed web site or in some external web site. HTML is the computer language used to "compose" and represent information on a web page. By clicking a mouse on the hypertext, the user is automatically "transported" from a current web page to a new web page linked to that hypertext.

For example, the master list server sends the request to a Domain Name Server ("DNS") responsible for handling calls to this address. If the DNS recognizes the call, then an affirmation is sent to the master list server that directs the call to the server storing the particular home page. When the hypertext is selected, the browser requests a connection to the HTTP server hosting the file and it also requests from the HTTP server the file identified by the URL address. If the HTTP server accepts the connection requested by the browser, the HTTP server proceeds to transmit the requested file back to the browser. Once the browser receives the requested file, it delivers or presents the content of the file to the requesting user.

One of the most popular mediums for browsing the Internet is the World Wide Web. The World Wide Web is a client/server application that helps the user access various HTML pages available at various Internet sites. Its function is to display documents and to make links between items of information available. The user then chooses which links to follow as the user pursues a course through various World Wide Web pages. An Internet World Wide Web site refers to an entity connected to the Internet that supports World Wide Web communications and/or World Wide Web files. A typical web site will include an HTTP server and one or more HTML pages (sometimes referred to as World Wide Web pages).

A web site is usually configured to include a home page and a plurality of HTML pages that may each contain one or more hyperlinks. As a user clicks on one hyperlink in the home page, the user is transported to another HTML page. Further pages may have, for example, a hyperlink that returns the user to the home page or a hyperlink that forwards the user to a subsequent page.

A player can access a global computer network such as the Internet from a personal computer. It is contemplated in accordance with the present invention that other devices, such as a mobile telephone or pager can also access the Internet and allow information transfer as will be described with reference to a personal computer. The remainder of this application will refer to, for simplicity, a personal computer by which a player transmits and receives information regarding information transfer.

As shown in FIG. 1, a personal computer preferably contains a microprocessor 110 that executes instructions from its Read Only Memory (ROM) and during such execution, the microprocessor 110 temporarily stores and accesses information from the Random Access Memory (RAM). The microprocessor 110 is also attached to a remote video display driver and remote monitor 116. The remote monitor 116 displays outcome data of one or more slot machines 160, 161, 162 that has been received from a casino server 140 via the Internet 120. Also connected to the microprocessor 110 of the personal computer is a mouse 112, keyboard 114 and/or other accessories that a player may use to input information such as play preferences. Assuming that the player has accessed a casino web site 130 that allows interactive information transfer, the information entered by the player is available to a casino server 140 and one or more slot machines 160, 161, 162 therein.

The remote personal computer and microprocessor 110, as displayed in FIG. 1, is communicatively connected to the casino server 140 and attached data storage unit 150 via the casino web site 130. The casino web site 130 is a remote wagering network controlled by the casino server 140. It is contemplated in accordance with the present invention that the web site 130 may be owned and operated by agencies or organizations separate from the casino; however, it is preferable that the casino server 140 and the casino web site 130 are in constant communication to allow players access to the outcome information emanating from the slot machines 160, 161, 162 within the casino.

At least one slot machine 160 within the casino communicates outcome data to the casino server 140 for transfer to the casino web site 130 and to the player. Outcome data shall be understood to include information including, but not limited to, all game-related activity such as the position of the reels of a slot machine 160, an indication of whether the player has won or lost and the corresponding amount won or lost. This data is passed from the individual slot machine 160 to the casino server 140 and subsequently to the casino web site 130 and player.

Each slot machine 160 has unique identifying characteristics that allow the casino server 140 to distinguish the outcome data as being sent from a particular machine and to store and transmit that data with reference to that particular machine. The casino, via its web site 130, asks the player the type of game from which the player wishes to receive information. For example, the player may choose to be connected to a gaming machine such as a video or mechanical slot machine, video blackjack machine, video poker machine, video roulette machine, video keno machine or a video bingo machine. The slot machines 160, 161, 162 in FIG. 1 may be replaced with any of these other types of gaming machines. After receiving information from the player regarding the type of game desired to be played, the casino web site 130 transmits this information to the casino server 140 at the casino.

The slot machine 160 generally possesses myriad random gaming events in which a player has the opportunity to place a wager on the outcome of the random event. Each slot machine 160 includes a microprocessor, clock, and an operating system. The microprocessor executes the instructions for playing the slot machine 160 and includes a random number generator. Random Access Memory (RAM) temporarily stores information passed on to it by the microprocessor.

The slot machine 160 is initiated by inserting a coin or coins, using electronic credit or by other methods commonly known in the art. The game begins in response to the player activating a starting device (e.g., by pulling a lever or pushing a button). This activation causes the microprocessor within the slot machine 160 to set the reels in motion and the random number generator randomly selects a number that corresponds to a given outcome. The microprocessor stops the reels to display the symbols corresponding to the selected random number outcome. If the slot machine 160 is of the video type, simulated reels are rotated and stopped to place symbols on the reels in visual association with a video display area.

In response to the activation of the slot machine 160, the microprocessor's random number generator generates a random number that corresponds to a given outcome. In accordance with one embodiment of the present invention, a remote player, via the Internet 120 or other global computer network, places a wager on the outcome of this random number generation. The casino then transmits the outcome of the random number generation in either a predetermined format or a format selected by the player.

The casino server 140 also has a microprocessor, a clock and an operating system associated therewith. The microprocessor of the server executes instruction of a program stored in read-only memory (ROM) and the microprocessor temporarily stores information in RAM. In order to communicate with the remote slot machine 160, each slot machine 160 is connected to the casino server 140. The server includes one or more communications ports to connect with each slot machine 160 and also to the network in order to transmit data to the casino's web site 130 and eventually to the player. Furthermore, the microprocessor of the casino server 140 is united to a data storage unit 150 comprising a transaction processor 156, a casino player database 155, a session database 154, remote wagering database 152 and a gaming machine database 153.

In general, the transaction processor 156 manages the contents of the data storage unit. The casino player database 155 includes multiple records having multiple fields of information related to the identification of each player. The fields within each record include, for example, name, social security number, player identification number, address, telephone number(s), credit card type, number and expiration date, credit balance and other requisite information.

The session database 154 comprises multiple records, each record relating to a remote play session. One field in each such record contains the player identification number and other fields include the type of slot machine 160 and its identification number to be accessed, the outcome(s), the bet per game, reel positions and payout. It is contemplated in accordance with the present invention that a remote player may choose multiple slot machines 160, 161, 162 for remote information transfer.

The remote wagering database 152 includes multiple records, each of which corresponds to a different slot machine 160. Each record comprises fields including the terminal location, the player identification for players using the machine, start and end times for each player and gaming machine type. The information recorded in this database 152 is used to determine the amount of time that each slot machine 160 is used.

The gaming machine database 153 also contains information regarding each gaming machine. Each slot machine is, as noted above, associated with particular identifying information and this information is stored in one field of the slot machine database 153. Other fields include machine type, machine denomination, maximum coins allowed, outcome data, and for reel games, reel position and payout. This database 153 allows the casino server 140 to easily search and discover the different machines that possess different types of games.

The general operation of the system according to one embodiment of the present invention is discussed in connection with FIGS. 2*a*, 2*b*. After accessing the Internet 120, at step 205 of FIG. 2*a*, the player can simply request transfer to a casino's URL address or web site 130, in step 210, in the manner described above. After gaining access to this address/site, a player will, in order to be able to receive information directed from a casino, need to register, as shown at step 215 of FIG. 2*a*, with the web site 130. One preferred method of obtaining identification from a player is to create a user identification ("User ID") number or name and password as commonly performed on many web sites. In order to create such a User ID, the web site 130 will preferably require the input of many pieces of information from a registering participant, such as name, address, telephone number, preferred game or games, preferred bet per game, credit card number, type of credit card, expiration date and other pertinent information. After receiving this information, the casino web site 130 notifies the casino server 140 of the player's desire to obtain a transfer of information. The casino server 140 processes the information, stores the relevant identification information within the casino player database 155 and assigns a User ID and password to the new player. The User ID and password serve as an identification tag for a player to allow the player to easily and repeatedly enter and receive information associated with the casino web site 130 of the present invention. Once the User ID and password are accepted by the Web Administrator, the player is able to access the games.

Specifically, after accessing the casino web site 130 (or another authorized site designated to handle logging into a casino or gaming establishment), a player can enter or "log in" to, at step 220, the gaming area by providing, for example, the User ID and password, as described above. After receiving this information, the casino web site 130 will process the information, store the relevant identification information within the casino player database 155 and assign a User ID and password to the new player.

The User ID and password serve as an identification tag for a player to allow the player to easily and repeatedly enter and receive information associated with the web site 130. Once the User ID and password are accepted, the player is given an option of the type of game to play, the amount to wager, etc. The player will indicate the preferred options using one or more selection buttons, mouse 112 inputs and/or keyboard 114 inputs. The player must also provide a means to pay for the information to be transferred from the casino to the player via the Internet 120. One preferred method that a player can ensure payment for the information transfer is to arrange an account with the casino or other organization that maintains control over the web site 130. A player wishing to arrange such an account can deposit funds with the casino in person or arrange for a line of credit in the casino account. Each time a player participates in a game by asking for an information transfer, the casino will deduct from the casino account the amount of the fee for the game or portion of a game that is played. Payouts for winning outcomes can be added to the casino account. It is also contemplated in accordance with the present invention that the session database 154 and remote wagering database 152 can "remember" the amount wagered, lost, and won for a player during a particular gaming session and only remove or add to a casino account, depending on the random outcomes, at the end of a gaming session.

As an initial step in the operation of the present embodiment, the remote player may add funds to the player's credit balance. Funds are supplied to the player account via a credit card that the player has previously submitted to the casino. It is also contemplated in accordance with the present invention that a player can enter a credit card number via input means such as a mouse 112 and/or a keyboard 114 each time that the player begins an information retrieval session.

The casino web site 130 transmits the player identifying information at step 225 of FIG. 2*a* to the casino server 140. The casino server 140 accesses the record in the casino player database 155, at step 230, containing the received player identification information. The server proceeds to access the credit availability and credit information of the player. The microprocessor of the server 140 authenticates the player identification number, which involves searching the casino player database 155 for the record having the received player identification numbers. If no record exists in the casino player database 155 having the particular player identification number, than the remote player is rejected and play is disallowed. If the casino player database 155 identifies a record containing the player identification number, the remote player is accepted for remote play.

Figure 2B:
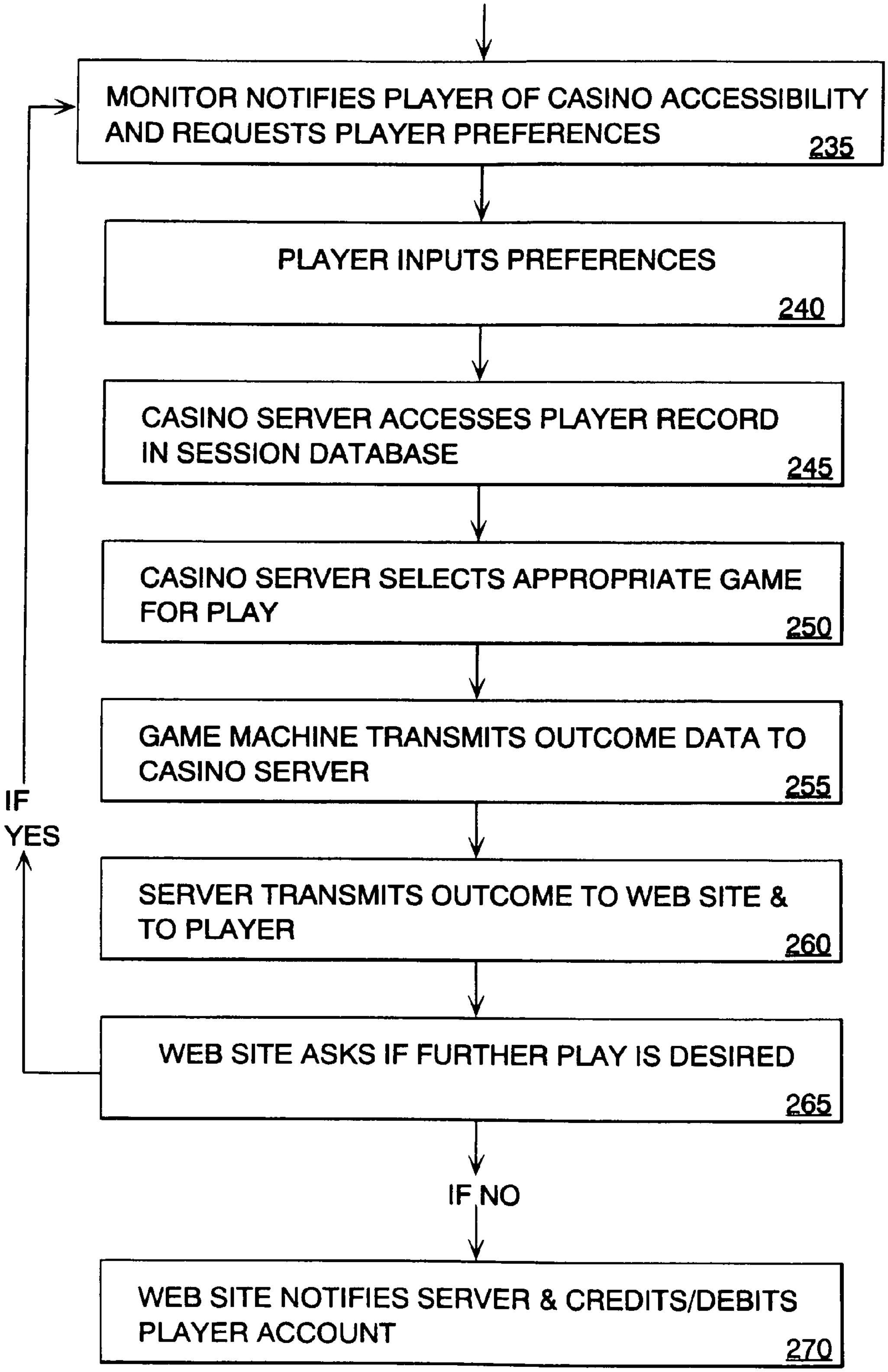

Once the credit and payment information is accessed, the player is then notified, at step 235 of FIG. 2*b*, to initiate remote play. Preferably, the remote monitor 116 displays a prompting message requesting that the remote player input the play preferences. Specifically, the casino server 140 transmits a signal to the casino web site 130 that displays, on the remote monitor 116, the prompting message.

In order to respond to the prompting message and place a specific wager on the outcome of the random number generation, the player communicates, at step 240, one or more preferences to the casino regarding the slot machine 160 event. The remote player proceeds to enter play preferences via a mouse 112 input, a keyboard 114 input, a touch pen input, a touch screen input or other input means commonly known in the art. For example, the player may determine the amount of wager wished to be placed on a random event or the type of reward that player wishes to receive, if any. It is also contemplated in accordance with the present invention that the player may decide, via the Internet 120, what types of bonus prizes are desired and/or the different types of options to pursue if or when a bonus round is initiated.

The play preferences and other identifying information are then transmitted from the casino web site 130 and to the casino server 140 for inclusion in the appropriate field of the player's record in the session database 154, as shown at step 245 of FIG. 2*b*. Having received the play preferences, the casino server 140 accesses the record in the remote wagering database 152 and proceeds to enter the player identification into the appropriate field of that record.

After creating a record in the remote wagering database 152, the casino server 140 searches the slot machine database 153 for a slot machine(s) that matches (or most nearly matches) the play preferences, at step 250, inputted by the player. The casino then selects that machine(s) for use. The casino server 140 may select slot machines that are currently in use by live players (players physically present at the slot machines) of those that are not in use by live players. The selected slot machine(s) randomly generates outcome data for transmission to the casino server 140. When generating the outcome data for a remote player, the slot machine does not visually display the outcome data or the generation of the outcome data on the slot machine itself. Such visual presentations by the slot machine itself are reserved for live players physically present at the slot machine.

The casino server 140 receives the outcome data from the selected slot machines. Where the outcome data includes the visual representation of the outcome, i.e. reel positions, the reel positions may be received by the casino server 140. Furthermore, so that the casino server 140 can identify which of the received outcome data corresponds to which slot machine, the slot machine transmits the outcome data, at step 255, along with its machine identification number. In alternate embodiments, other machine identifying information may be transmitted with the outcome data.

The casino server 140 proceeds to transmit, at step 260, the outcome data for those selected slot machines to the casino web site 130 and then to the player. In the present embodiment, the remote monitor 116 displays the outcome, such as the reel positions (or card values for video poker machines) as well as the payout information, if any. Furthermore, the remote monitor 116 may simulate play of the selected slot machine based upon the received outcome data by generating a graphical display of spinning reels in the same manner as a conventional slot machine. In alternate embodiments employing gaming devices other than slot machines, the remote monitor 116 similarly may simulate play, such as the graphical dealing of cards or spinning of a roulette wheel.

The casino server 140 updates the remote player's credit balance field that is also displayed on the remote monitor 116. After the server updates the player's credit balance field at the casino server 140, the casino server 140 determines whether the player has sufficient funds remaining to allow continued play. After this determination, the casino server 140 relays information through the casino web site 130 to the player and inquires if further play is desired, at step 265 of FIG. 2*b*. If sufficient funds remain, the remote monitor 116 displays a request by asking the player if continued play is desired and, if so, returns to step 235 and asks for play preferences. If the credit balance contains insufficient funds, the server directs the remote monitor 116 to display a message indicating a lack of funds. In response, the player may discontinue remote play or the player may deposit additional funds or authorize further credit for continued play, as described above. If play is discontinued for either of the above reasons, the player "cashes out" at step 270 and terminate the play session.

The steps for cashing out when remote play is completed are as follows. After indicating that the player no longer wishes to play or does not have further funds to continue playing, the casino web site 130 transmits the player identification number to the casino server 140. The casino server 140 receives the player identification number and proceeds to access the record in the casino player database 155 corresponding to that player identification number. The casino server 140 proceeds to transmit the value stored in the credit balance field to the credit card.

In one embodiment, the slot machine communicates only the payout information to the casino server 140, which in turn generates a visual representation of an outcome representative of that payout information. For example, outcome data of plus ten coins for one particular type of machine may be represented by a generated visual display on the remote monitor 116. The casino server 140 generates the accurate visual representation of the outcome by accessing the slot machine database 153 and, based upon the machine identification information transmitted with the payout, the record for that slot machine. A payout structure for that particular slot machine is maintained within the record in the appropriate field. The payout structure, like the payout table in the slot machine, correlates the payout received from the slot machine to a possible set of reel positions.

For example, when the reels of a slot machine reveal "cherry-cherry-cherry," the slot machine may have determined that the player should receive a payout of ten coins. The slot machine then communicates to the casino server 140 that the game outcome revealed that the player should receive a payout of ten coins. The casino server 140, by accessing the payout structure, correlates the payout of ten coins back into a set of reel positions and generates a visual representation of the outcome of the slot machine for transmission to the remote monitor 116 for display to the player. Because several reel positions may correspond to the same payout, the casino server 140 may generate reel positions different than the outcome that was visually displayed on the slot machine.

In another embodiment, no live outcome data is received from a slot machine. Instead, the casino server 140 selects historical outcome data previously stored in a field of the slot machine database 153. As when live outcome data is used, the casino server 140 selects the historical outcome data based upon the play preferences. As will be apparent to one skilled in the art, use of historical outcome data is particularly advantageous to slot machine and casino owners. Each portion of outcome data received by the casino server 140 has inherent value. This value stems, at least in part, from the resources required to generate the outcome data, such as capital investment in each slot machine, electricity to operate the slot machine, and wear on the slot machine from each play. Thus, by storing the outcome data in the historical outcome data field, the system is able to reuse outcome data.

In alternative embodiments, the historical outcome data includes the historical outcome of at least one play of a gaming device, the historical payout of at least one play of a gaming device, or both the historical outcome and historical payout. Where the historical outcome data includes both historical outcome and historical payout information, the casino server merely retrieves the historical outcome data and the system proceeds, as described above, based upon this information. Where the historical outcome data is just historical outcomes, the casino server 140 determines the historical payout information by accessing the payout structure.

Where the historical outcome data includes only historical payout information, the casino server 140 may first generate a visual representation of the corresponding historical outcome. As with a live outcome, the casino server 140 generates a visual representation of the historical outcome by accessing the payout structure and, based upon the known historical payout, generating the visual representation data for transmission to the player. The system proceeds based upon the historical payout and the generated visual representation data.

In yet another embodiment of the present invention, the gaming player enters credit card information into appropriate locations on the casino's web site 130. To accept wagers, the operator of the web site 130 establishes an account commonly referred to as a Merchant Account. The Merchant Account enables Internet businesses to engage in credit card transactions. Similar to traditional storefront businesses, a contractual agreement is made between a commercial bank and the web site business. This agreement allows the web site 130 to accept major credit cards (i.e., Visa, Master Card, Diner's Club, American Express, etc.). To ensure the privacy of the credit card user, the web site 130 of the present invention employs security software designed specifically to safeguard and protect users that engage in credit card transactions via the World Wide Web. Further, if a credit card is used inappropriately on the web site 130 of the present invention, the appropriate credit card owner (and/or credit card) is reimbursed for the losses incurred relating to charges on the site. To avoid credit card fraud, specific measures commonly known in the art are taken to protect the credit card user.

A player deciding to participate in the information transfer is asked to fill out a series of items to verify his or her credit card information. The player fills in items, for example, that ask for the player's name, credit card number, type of credit card, credit card number, credit card expiration date, address, telephone number and other pertinent information. Once the information has been transmitted and verified, the player is able to participate in the information transfer and the Merchant Account software enables the player's charges to be deposited from the credit card account into the business checking account of the Administrator of the Web site 130.

When an outcome is returned to the player, the casino web site 130 inquires if the player would like to continue playing, "cash out" any winnings, or perhaps participate in a bonus game if such is offered by the game. It is noted in accordance with the present invention that the types of slot machines are widely varied and many options that are not discussed here can nonetheless be transferred to the player via the Internet 120 in order to provide more entertainment to the player.

Preferably, the Merchant Account will allow a transaction with a player's credit card only at the end of a gaming session. It is impractical and costly for the Merchant Account to conduct a transaction each time the player participates in the information transfer and each time the player receives a payoff from the information transfer outcome.

It is also contemplated in accordance with a further embodiment of the present invention that the casino server 140 itself (or an auxiliary server coupled to the casino server 140) can generate random numbers and corresponding outcomes to be transmitted to a player via a global computer network. In other words, the game software for the slot machine 160 or other type of gaming machine would reside in the casino server 140. Also, the server 140 and casino web site 130 may be associated with a gaming establishment other than a casino.

Each of these embodiments and obvious variations thereof is contemplated as falling within the spirit and scope of the claimed invention, which is set forth in the following claims:

What is claimed is:

1. A method for transferring gaming data on a global computer network comprising:

generating a first random number by one or more processors within said gaming establishment;

interpreting said first random number to generate a first text or graphical outcome;

converting the first text or graphical outcome to a data format readable on a gaming machine in the gaming establishment prior to visually presenting the text or graphic outcome on a display to a first player inside the gaming establishment;

receiving player identification information from a second player outside of a gaming establishment;

analyzing said player identification information;

requesting player input from said second player regarding a random event;

receiving and analyzing said player input;

generating a second random number within said gaming establishment by the one or more processors;

interpreting said second random number to determine a second text or graphical outcome in response to said player input;

storing said second text or graphical outcome prior to converting said second text or graphical outcome to a data format to visually present said second text or graphical outcome to said second player, wherein the second text or graphical outcome includes reel positions;

displaying the second text or graphical outcome inside the gaming establishment;

transmitting said stored second text or graphical outcome through said global computer network to said second player outside of the gaming establishment; and displaying different reel positions of the second text or graphical outcome to the second player than the reel positions inside the gaming establishment.

2. The method of claim 1, wherein said random event takes place in a microprocessor within said gaming machine located within said gaming establishment.

3. The method of claim 1, wherein said random event takes place in a microprocessor within a server within said gaming establishment.

4. The method of claim 1, wherein said global computer network is the Internet.

5. The method of claim 1 wherein the remote machine simulates play by generating a graphical display of the randomly determined outcome based on graphics stored in the remote machine prior to the randomly determined outcome and displayed by the remote machine based on the stored graphics.

6. The method of claim 5, wherein the one or more memory devices and the one or more processors are resident within the gaming machine within the gaming establishment.

7. A method of transferring data via a global computer network, comprising:

receiving, via said global computer network, an access request from an access device outside a gaming establishment;

receiving, via said global computer network, identification information from said access device;

granting access to a server within said gaming establishment;

requesting the generation of a random number, said random number being generated from within said gaming establishment by one or more processors;

storing a text or graphical outcome resulting from said random number prior to converting said text or graphical outcome to a data format to visually present said text or graphical outcome, wherein the text or graphical outcome includes reel positions;

displaying the text or graphical outcome inside the gaming establishment;

sending, via said global computer network, said stored text or graphical outcome resulting from said random number to said access device outside said gaming establishment, said text or graphical outcome being presented in a graphical format by a display on said access device outside said gaming establishment; and displaying different reel positions of the text or graphical outcome than the reel positions displayed inside the gaming establishment to a player viewing said access device.

8. The method of claim 7, wherein said global computer network is the Internet.

9. The method of claim 7, wherein said generation of said random number is accomplished at said gaming machine within said gaming establishment.

10. The method of claim 7, wherein said generation of said random number is accomplished at a server within said gaming establishment.

11. A method for transferring gaming data on a global computer network comprising:

storing, in one or more memory devices within a gaming establishment, a wagering game, including storing graphics for a plurality of possible stored outcomes of the wagering game prior to playing the wagering game;

receiving, via an input device of a gaming machine within the gaming establishment, an input from a first player to play the wagering game;

randomly selecting, by one or more processors within the gaming establishment, an outcome from the plurality of possible stored outcomes;

presenting, on a display device of the gaming machine within the gaming establishment, the graphics for the selected outcome;

receiving player identification information from a second player outside of the gaming establishment;

receiving an input from the second player to play the wagering game stored in the one or more memory devices within the gaming establishment;

randomly selecting, by the one or more processors, a second outcome from the plurality of possible stored outcomes; and transmitting, via the global computer network, the graphics for the selected second outcome to said second player outside of the gaming establishment such that the graphics can be visually presented to the second player, wherein the graphics for the selected second outcome are not visually displayed inside the gaming establishment.

12. The method of claim 11, wherein the one or more memory devices are resident within the gaming machine within the gaming establishment.

13. The method of claim 11, wherein the one or more processors are resident within the gaming machine within the gaming establishment.

14. The method of claim 11, further comprising presenting a page from a computer global network to the second player, the page including one or more game choices to allow the second player outside a gaming establishment to play the wagering game.

15. The method of claim 14, wherein said page is an Internet-based World Wide Web page.

16. A method for transferring gaming data on a global computer network comprising:

storing, in one or more memory devices within a gaming establishment, a wagering game, including storing graphics for a plurality of possible stored outcomes of the wagering game prior to playing the wagering game;

receiving, via an input device of a gaming machine within the gaming establishment, an input from a first player to play the wagering game;

randomly selecting, by one or more processors within the gaming establishment, an outcome from the plurality of possible stored outcomes;

presenting, on a display device of the gaming machine within the gaming establishment, the graphics for the selected outcome;

receiving player identification information from a second player outside of the gaming establishment;

receiving an input from the second player to play the wagering game stored in the one or more memory devices within the gaming establishment;

randomly selecting, by the one or more processors, a second outcome from the plurality of possible stored outcomes;

presenting, on the display device of the gaming machine within the gaming establishment, graphics for the selected second outcome, the graphics including reel positions;

transmitting, via the global computer network, the selected second outcome to said second player outside of the gaming establishment; and presenting graphics for the selected second outcome to the second player, the graphics presented to the second player having different reel positions than the reel positions presented on the gaming machine within the gaming establishment.

17. The method of claim 16, wherein the one or more memory devices are resident within the gaming machine within the gaming establishment.

18. The method of claim 16, wherein the one or more processors are resident within the gaming machine within the gaming establishment.

19. The method of claim 16, further comprising presenting a page from a computer global network to the second player, the page including one or more game choices to allow the second player outside a gaming establishment to play the wagering game.

20. The method of claim 19, wherein said page is an Internet-based World Wide Web page.

* * * * *

UNITED STATES PATENT AND TRADEMARK OFFICE

CERTIFICATE OF CORRECTION

PATENT NO. : 8,303,414 B2
APPLICATION NO. : 12/075822
DATED : November 6, 2012
INVENTOR(S) : Shridhar P. Joshi It is certified that error appears in the above-identified patent and that said Letters Patent is hereby corrected as shown below:

In the Claims

In column 12, line 11 (claim 1, line 35), after “positions” insert -- displayed --.

Signed and Sealed this
Twenty-third Day of July, 2013

Teresa Stanek Rea
*Acting Director of the United States Patent and Trademark Office*